No. 714,369. Patented Nov. 25, 1902.
R. J. FLEMING.
VETERINARY SPECULUM.
(Application filed Aug. 4, 1902.)
(No Model.)
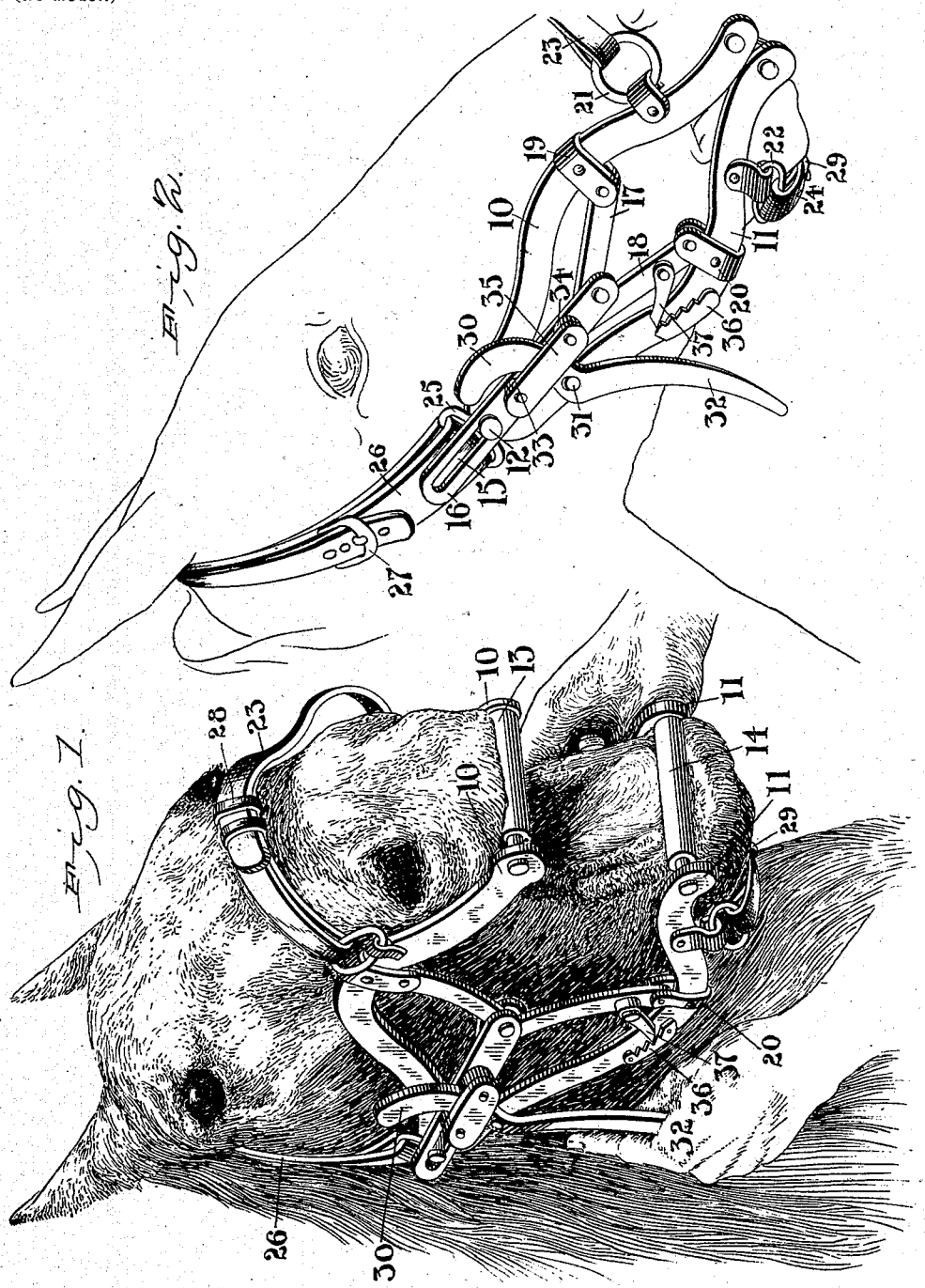
Witnesses
Robert J. Fleming, Inventor
by
Attorneys

UNITED STATES PATENT OFFICE.

ROBERT J. FLEMING, OF TRAVERSE CITY, MICHIGAN.

VETERINARY SPECULUM.

SPECIFICATION forming part of Letters Patent No. 714,369, dated November 25, 1902.

Application filed August 4, 1902. Serial No. 118,329. (No model.)

*To all whom it may concern:*

Be it known that I, ROBERT J. FLEMING, a citizen of the United States, residing at Traverse City, in the county of Traverse and State of Michigan, have invented a new and useful Veterinary Speculum, of which the following is a specification.

This invention relates to devices employed for the purpose of facilitating the administration of medicine to horses or other animals or to facilitate working in the mouth in treating the teeth or adjacent organs accessible through the mouth, and has for its object the construction of an easily operated and applied device whereby the mouths of horses and other animals may be forcibly opened and held open without injury to the animal.

The invention consists in certain novel features of the construction, as hereinafter shown and described, and specified in the claims.

In the drawings illustrative of the invention, Figure 1 is a perspective view of the device applied and in its expanded position. Fig. 2 is a perspective view of the device applied and in its contracted position.

In this device is embraced two spaced frames adapted to embrace opposite sides of the animal's head and secured in place by suitable straps and containing an expanding bit engaging the animal's mouth and with means carried by the frame whereby the bit may be expanded to forcibly open the mouth and hold it open as long as desired. The frames referred to are duplicates, so that like designating characters will be employed for like parts in each frame. The frames consist of reversely-curved side bars 10 11, pivotally united at their upper ends at 12 and provided with spaced bits 13 14 at their opposite ends, the bits preferably in the form of rollers and uniting the opposite frame members 10 11, as shown. The bit members when the frame members 10 11 are compressed will be adapted to fit the animal's mouth in substantially the same manner as an ordinary bit, except that there are two bit-bars instead of one. The bit members 13 14 are preferably covered with rubber or other suitable yieldable material to prevent injury to the animal when in use. The pivot-pin 12 of the bars 10 11 extends laterally and engages a slot 15, arranged longitudinally in a bar 16, the bar extending inwardly between the bars 10 11 and united movably to two diverging bars 17 18, the outer ends of the latter connected to clips 19 20, secured to the bars 10 11 intermediately of their lengths and forming a toggle-joint, as shown. By this arrangement it will be obvious that if the bar 16 be moved inward the bars 17 18 will exert an outward force upon the bars 10 11 and distend them, whereas, on the contrary, if the bar 16 be moved outwardly the bars 10 11 will be drawn toward each other, the movement of the bar 16 thus controlling the relative positions of the bit members 13 14.

Attached to the forward ends of the bars 10 11 are rings 21 22, affording means for the attachment of straps 23 24, the strap 23 adapted to be passed over the nose of the animal and the strap 24 adapted to be passed beneath the lower jaw, by which means the device is attached adjustably to the sides of the animal's head and the bit members 13 14 supported in place.

At the junctures of the bars 10 11 loops 25 are connected to afford means for the connection of a strap 26, passed over the animal's head behind the ears and completing the connection of the device to its head. The strap 26 will be provided with a buckle 27, and the straps 23 24 will likewise be provided with buckles 28 29, respectively, so that the device may be readily adjusted to the head of the animal. By this simple arrangement it will be readily understood the device is supported upon the head of the animal similar to an ordinary headstall, and in the case of horses will so closely resemble the headstall that it will not excite the fears of the horse or cause him to shy when it is applied.

Means will be attached to the device for forcibly operating the bar 16 and its attachments, and this means consists in a curved cam-lever 30, pivoted at 31 to one of the bars 10 or 11, preferably to the under bar 11, and provided with an operating-handle 32. Attached to the bar 16 on opposite sides of the cam-lever 30 are antifriction-rollers 33 34, with which the cam-lever 30 engages, as shown. The outer ends of the pivots of the rollers 33 34 are connected by a keeper 35, which serves the double purpose of a support to the rollers and also as a guard to prevent lateral movement of the cam-lever. By this simple arrangement it will be readily understood that any movement of the handle member 32 will operate the cam-lever 30 and correspondingly move the arm 16 longitudinally of the device, the longitudinal slot 15 forming a guiding means to the bar to maintain it in its proper relative position with reference to the bars 10 11.

Attached to the bar 11 is a bar 36, having spaced ratchet-teeth with which a pawl 37 on the arm 18 engages, so that the bars 10 11 may be forcibly held at any point and prevented from being closed. By this arrangement it will be obvious the bit members 13 14 may be forcibly distended to any desired extent to forcibly open the animal's mouth to a corresponding extent by simply operating the handle members 32 and the mouth held open for any length of time by means of the pawls 37, engaging the ratchet-racks 36, and then when the device is to be released it is only necessary to throw the pawls out of engagement with the racks. By this simple structure the mouth of the animal may be easily and gradually opened and without straining the muscles of the mouth or injuring the animal in any manner. The device can be handled very gently, so that the fears of nervous animals will not be excited.

With this device the whole interior of the mouth of the animal is exposed, so that the teeth and other organs or parts accessible through the mouth may be treated without injury to the animal and without danger or inconvenience to the operator.

The parts are all very simple in construction and will be made as light as possible to retain the necessary strength.

It will be noted that the combination of the parts secures a very strong leverage, so that the resistance of the strongest animal will not be sufficient to prevent its operation.

The friction roller-bearings 33 34 are an important feature of the invention, as they greatly reduce the friction between the parts and reduce the resistance to a minimum.

The parts may be modified in minor particulars without affecting the principles of the invention, and I do not wish to be limited to the precise structure shown in all its details.

Having thus described my invention, what I claim is—

1. In a device of the character described, spaced side frames engaging the head of the animal, means for attaching said frames to the upper and lower jaws, spaced bit members connecting said frames, toggle-levers connecting the frames, and a cam-lever having an operative connection with said toggle-levers.

2. In a device of the class specified, spaced frames adapted to be secured to the upper and lower jaws of the animal and provided with bit members, toggle-levers connecting the frames, a sliding bar connected to the toggle-levers, and a pivoted cam-lever for effecting the longitudinal movement of said sliding bar.

3. In a device of the character described, spaced side bars engaging the head of the animal from opposite sides and pivotally united at one end and connected through the mouth of the animal at their other ends by spaced bit members, a longitudinally-movable bar having a slot engaging the uniting-pivot of said side bars, distending-bars coupled by their adjacent ends to said slotted bar and movably engaging said spaced bars intermediately of their lengths, and means carried by said side bars for forcibly actuating said longitudinal bar and thereby causing said side bars and connected bit members to separate and correspondingly distend the mouth of the animal, substantially as described.

4. In a device of the character described, spaced side bars engaging the head of the animal from opposite sides and pivotally united at one end and connected through the mouth of the animal at their other ends by spaced bit members, a longitudinally-movable bar, distending-bars coupled by their adjacent ends to said longitudinal bar and movably engaging said spaced bars intermediately of their lengths, and means for forcibly actuating said longitudinal bar and thereby correspondingly operating said side bars and their connected bit members, substantially as described.

5. In a device of the character described, spaced frames adapted to be distended and engaging the head of the animal from opposite sides, spaced grip members connecting said frames through the mouth of the animal, a longitudinally-movable bar, distending-bars movably coupled to said longitudinal bar and movably engaging said spaced frames intermediately of their lengths, and a cam-lever movably engaging one of said frame members and adapted to operate said longitudinal bar and its connected distending-bars, substantially as described.

6. In a device of the character described, spaced frames adapted to be distended and engaging the head of the animal from opposite sides, spaced bit members connecting said frames through the mouth of the animal, a longitudinally-movable bar, distending-bars movably coupled by their adjacent ends to said longitudinal bar and movably engaging said spaced frames intermediately of their lengths, and means carried by said frame for actuating said longitudinal bar and its connected distending bars and frames, substantially as described.

7. In a device of the character described, spaced side bars engaging the head of the animal from opposite sides and pivotally united at one end and connected through the mouth of the animal at their other ends by spaced bit members, distending-bars movably coupled by their adjacent ends and movably engaging said spaced side bars, a longitudinally-movable bar engaging said distending-bars at their coupled ends, and a cam-lever carried by one of said spaced bars and movably engaging said longitudinal bar and adapted to operate it and its connecting distending-bars, substantially as described.

8. In a device of the character described, spaced side bars engaging the head of the animal from opposite sides and pivotally united at one end and connected through the mouth of the animal at their other ends by spaced bit members, distending-bars movably coupled by their adjacent ends and movably engaging said spaced side bars, a longitudinally-movable bar engaging said distending-bars at their coupled ends and having a longitudinal slot engaging the uniting-pivot of said side bars, and a cam-lever carried by one of said spaced bars and movably engaging said longitudinal bar and adapted to operate it and its connected distending-bars, substantially as described.

In testimony that I claim the foregoing as my own I have hereto affixed my signature in the presence of two witnesses.

ROBERT J. FLEMING.

Witnesses:
WILLIAM H. EARLS,
BENJAMIN S. HADLEY.